April 22, 1952  W. O. BENNETT, JR  2,593,650
TIME COMPARATOR

Filed July 15, 1944  7 Sheets-Sheet 1

FIG. 1.

INVENTOR.
WILLIAM O. BENNETT, JR.
BY Murray W. Gould
ATTY.

April 22, 1952 — W. O. BENNETT, JR — 2,593,650
TIME COMPARATOR

Filed July 15, 1944 — 7 Sheets-Sheet 3

FIG. 3.

INVENTOR.
WILLIAM O. BENNETT, JR.
BY *Murray W. Gould*
ATTY.

April 22, 1952 W. O. BENNETT, JR 2,593,650
TIME COMPARATOR
Filed July 15, 1944 7 Sheets-Sheet 4

FIG. 4.

INVENTOR.
WILLIAM O. BENNETT, JR.
BY
Murray W. Gould
ATTY.

FIG. 5.

April 22, 1952 W. O. BENNETT, JR 2,593,650
TIME COMPARATOR

Filed July 15, 1944 7 Sheets-Sheet 6

FIG. 6.

INVENTOR.
WILLIAM O. BENNETT, JR.
BY
Murray W. Gould
ATTY.

FIG. 7.

INVENTOR.
WILLIAM O. BENNETT, JR
BY
Murray W. Gould
ATTY.

Patented Apr. 22, 1952

2,593,650

UNITED STATES PATENT OFFICE 2,953,650

TIME COMPARATOR

William Ogle Bennett, Jr., Lancaster, Pa., assignor to Hamilton Watch Company, Lancaster, Pa.

Application July 15, 1944, Serial No. 545,159

3 Claims. (Cl. 73—6)

The present invention is directed to an apparatus by means of which timepieces may be compared with the correct time and the deviation from the correct time indicated.

The purpose of the invention is to provide an apparatus hereinafter called a time comparator to permit an operator to determine the variation of the dial indication of a timepiece to be tested from standard time.

The object of the present invention is to provide an apparatus for comparing the indicated time of a timepiece with the indicated time of a master timepiece.

A further object of the present invention is to provide an apparatus which may be operated by one person to determine the difference between the indicated time of a timepiece and the correct standard time.

A further object of the present invention is to provide an apparatus with means to indicate to the hundredth of a second, the difference between the indicated time of a timepiece and the indicated time of a master timepiece.

A further object of the present invention is to provide an apparatus having visual means for indicating the beginning and end of a second.

A further object of the present invention is to provide a time comparator having means for signaling the start and finish of each half second.

A further object of the present invention is to provide an electric clock to be used as a master timepiece, and means for varying the indicated time of said electric clock by measured amounts.

A further object of the present invention is to provide an electric clock to serve as a master timepiece, and means for varying the indicated time of said electric clock to coincide with the indicated time of a timepiece to be tested.

A further object of the present invention is to provide an electric clock to serve as a master timepiece, and means for varying the indicated time of said electric clock to coincide with the indicated time of a timepiece to be tested, and means for making such coincidence known.

A further object of the present invention is to provide an electric clock having means for indicating the start and finish of each individual second and to provide means for varying the start and finish of each individual second to coincide with the start and finish of the corresponding second on the timepiece to be tested together with means for indicating the amount of such variation.

A still further object of the present invention is to provide a time comparator adapted to operate on standard frequency and means for setting said time comparator on standard time, a scale which may be set at zero position with the time comparator on standard time, means for bringing the time of the comparator into coincidence with that of a timepiece to be tested, said scale to indicate the time error of the timepiece.

A still further object of the present invention is to provide a time comparator with means for indicating time, means for varying the indicated time of said time comparator, means for synchronizing said time comparator with standard time and means for indicating coincidence of said time comparator with the indicated time of a timepiece to be tested.

A still further object of the present invention is to provide a comparator for marine chronometers wherein the comparator is used in combination with a microphone for amplifying the half second ticks of a marine chronometer.

A still further object of the present invention is to provide a comparator for marine chronometers wherein the comparator is used in combination with a microphone for amplifying the half seconds ticks of a marine chronometer and means for eliminating alternate ticks.

A still further object of the present invention is to provide a comparator for marine chronometers together with an indicating system for indicating coincidence between a chronometer to be tested and the time comparator and also for indicating whether said time comparator is either slightly advanced or retarded with respect to said marine chronometer.

A still further object of the present invention is to provide an electric clock mounted on a rotatable disc and an indicating scale frictionally driven by said disc and means for locking said scale in fixed position.

A still further object of the present invention is to provide a shiftable zero point by means of which a slight error in the setting of the comparator to correct time may be corrected.

A still further object of the present invention is to provide a spiral scale having more than one convolution and a vertically shifting viewing window through which only the desired portion of the scale may be seen.

A still further object of the present invention is to provide a safety device by means of which the device is rendered inoperative in event of momentary interruption of the standard power supply.

The invention is illustrated in the accompanying drawings in which.

Figure 1:
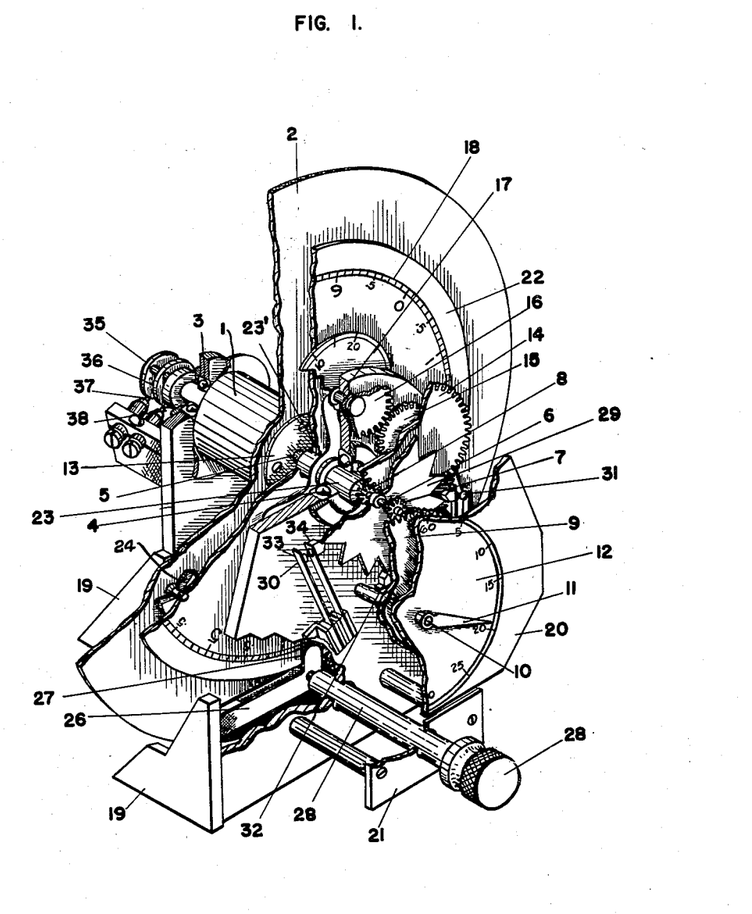
Fig. 1 is a broken perspective view of the comparator as used for comparing marine chronometers with standard time.
Figure 2:
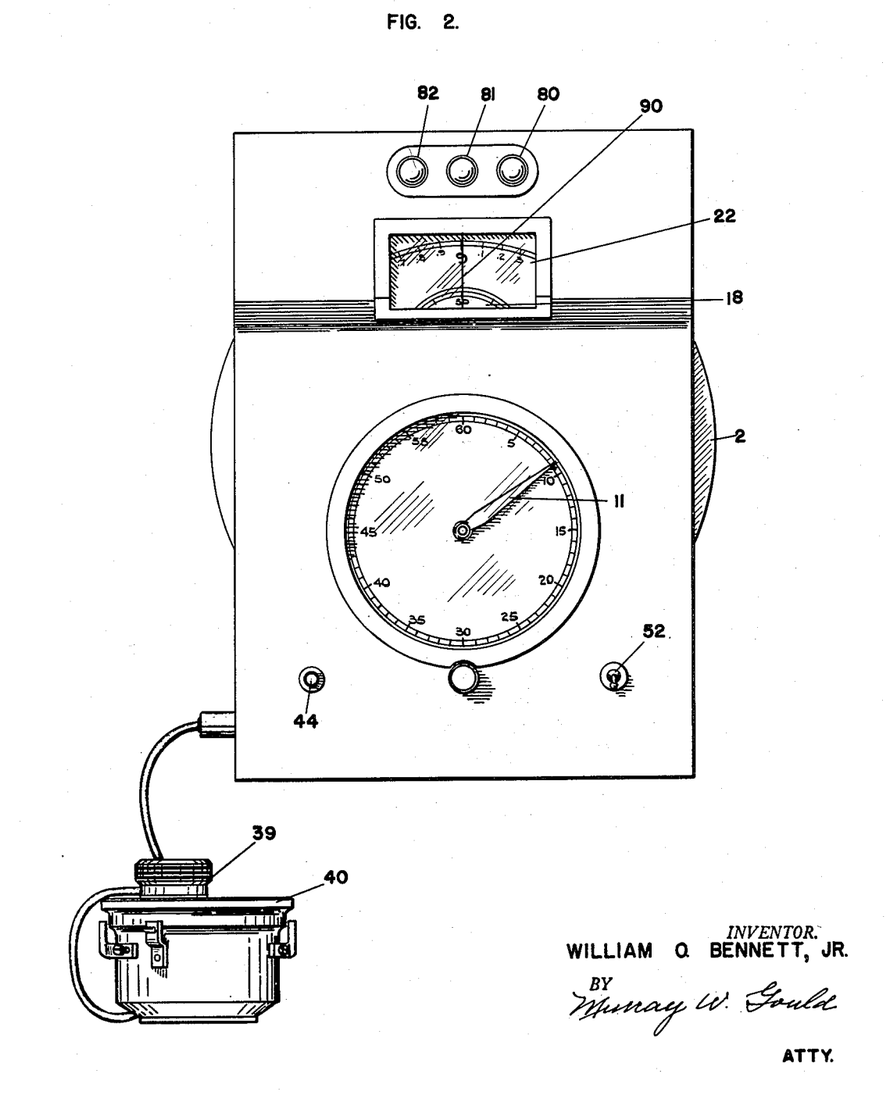
Fig. 2 is a front plan view of the same.

Referring in detail to the drawings, particularly Figs. 1 and 2, a synchronous electric motor 1 is mounted on a disc 2 and journaled in bearings 3 and 4. The disc 2 is carried on a flange 13 integral with sleeve 5 which houses a central shaft 6 having a pinion 7 thereon. Pinion 7 engages gear 9, driving shaft 10 and its attached hand 11 which indicates seconds on dial 12. An indicating dial 22 is mounted coaxially with disc 2, on sleeve 23 which journals sleeve 5 and is rotatably supported in bearing 4. A dial recording the revolutions of disc 22 is driven from pinion 8 through gear 14, gear 15, gear 16 and shaft 17, thus keeping an accurate count of the number of revolutions of dial 22.

The indicating dial 22 is keyed at 23' to sleeve 23 and carries friction pads 24 which are urged into contact with disc 2 by three pronged spring 25. This friction contact is such that the indicating scale 22 moves simultaneously with disc 2 under ordinary conditions.

Spring members 26 and 27 engaging disc 22 provide a clamp which is operated by screw 28 to hold dial 22 stationary while disc 2 is turned or to release dial 22 to permit 22 to be turned simultaneously with disc 2 through the frictional contact of the pads 24.

Carried on and turning with the shaft 6 is a cam 29. Contact mechanisms 30, 31 and 32 are arranged about the cam 29 contacting said cam and operated thereby. This cam 29 is preferably so proportioned that two consecutive teeth pass a given point every second.

The contact mechanisms 30, 31 and 32 are composed of a fixed contact 33 and a movable contact 34, the toothed points of the cam 29 engaging the movable contact 34, thus closing an electrical circuit between the movable contact 34 and fixed contact 33. These contact mechanisms 30, 31 and 32 are so spaced about the cam 29 that the contact 31 is contacted first, the contact 30 is contacted secondly, and the contact 32 is contacted thirdly in the passage of the wheel 29 through an arc equal to the distance between any two toothed points. This arrangement makes it possible to indicate through these contact mechanisms the exact instant at which the comparator is synchronized with the chronometer as will be explained later with reference to Fig. 7.

Figure 7:
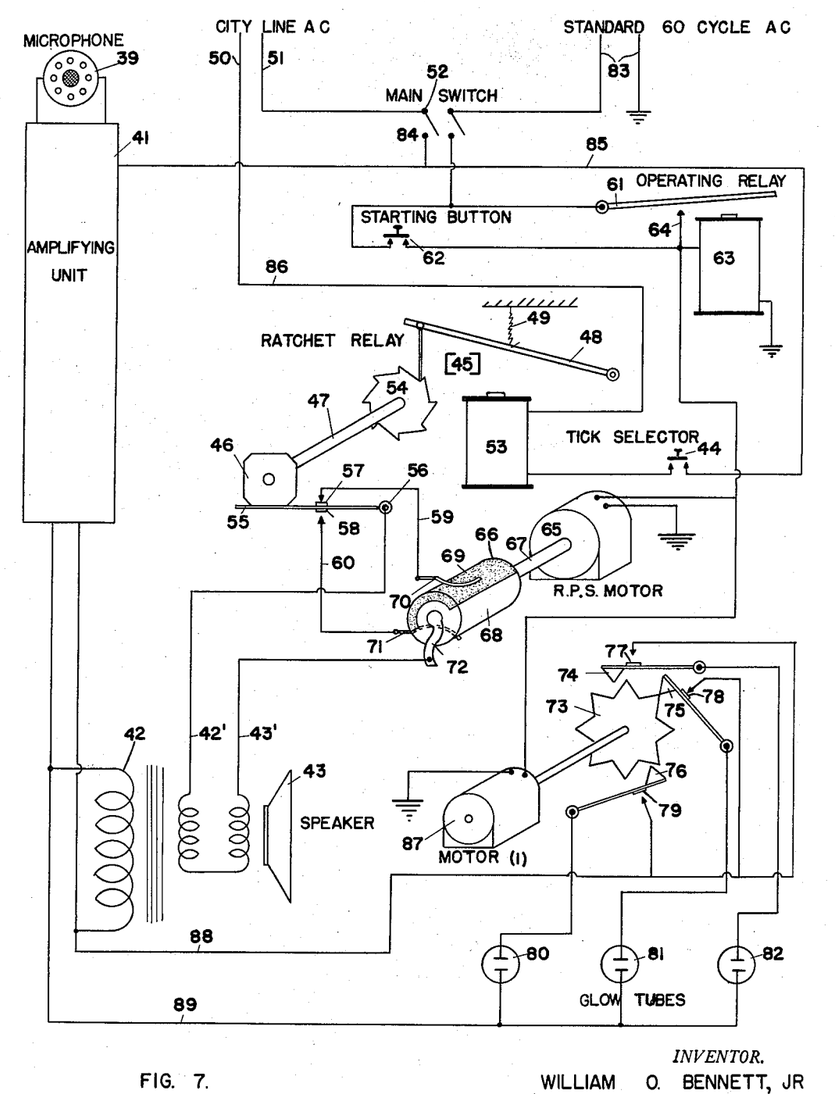
Fig. 7 is a diagrammatic view showing the wiring.

The motor 1 is operated through contact collecting rings 35 and 36 which receive current from contacts 37 and 38 connected to a source of standard frequency 83 (Fig. 7).

With regard to the operation of the mechanism shown in Figs. 1, 2 and 7, microphone 39 is placed in contact with a chronometer 40 so as to be energized each one-half second. The seconds hand of a chronometer advances twice, normally producing two audible ticks every second.

In order to properly synchronize the seconds hand of the time comparator with the seconds hand of the chronometer to be tested it is imperative that the synchronization takes place at the exact instant the hand passes the scale indication. In the apparatus about to be described the electrical impulses, which are produced as a result of the audible ticks of the chronometer are used to indicate this coincidence between the time comparator and the second hand of the chronometer. It is, therefore, desirable that alternate half second ticks be eliminated and the half second ticks which remain used as an indication of the passage of the seconds hand of the chronometer across its scale indication. In the mechanism shown diagrammatically in Fig. 7 the electrical impulses coming from the secondary of the transformer 42 are first passed through a rotating commutator which eliminates one of these electrical impulses. The electrical line is further carried to a selector mechanism by means of which either the half second period of electrical contact between the rotating commutator and a contact is selected or by changing the selected contacts, the other half second period is selected, thus making it possible to use the electrical impulses generated by the two audible ticks of the chronometer, one of which must be produced as the timepiece seconds hand crosses the scale indications.

The microphone is connected to amplifier 41, the output of which is passed through a transformer 42 to a speaker 43. The output of the amplifier consists of two D. C. pulses per second. Taken from the secondary of the output transformer 42 and the coil of the speaker 43 a line 42' is connected to a pivot 56 and a line 43' is connected to a contact 72 respectively. This allows the pulses originated by the audible ticks of the chronometer to be impressed on the commutator 66 which is turned by a 1 R. P. S. motor 65. The commutator 66 is formed with a contact section 68 and an equally extensive insulated section 69. Spring contacts 70 and 71 bearing against the circumferential portion of the commutator 66 are alternately in circuit with line 43' by reason of contact with sections 68 and 69. This alternatively completes a circuit between 43' and lines 59 and 60 which are selectively brought into contact with 57 and 58 carried on the arm 55 which completes the circuit between 43' and 42' through the pivot 56. The selector mechanism operated through a push button 44 brings into operation, a relay coil 53 which swings the arm 48 about its pivot against the action of spring 49 advancing the ratchet wheel 54 which turns the shaft 47 and cam 46. Cam 46 swings the arm 55 about the pivot 56 to bring contacts 57 or 58 into electrical contact with lines 59 or 60 respectively, thus completing a selective circuit by means of which one of the one-half second ticks of the chronometer is selected. This combination of the insulated commutator and ratchet relay completes a contact of one-half second duration in the circuit 43' and 42' once every second.

The actuating electromagnet 53 of the selector mechanism 45 is connected to a source of supply 50—51 through a main switch 52, contact 84, line 85, tick selector button 44, and line 86. Operation of the tick selector push button 44 completes the circuit to the electromagnet 53 drawing the arm 48 against the action of spring 49 advancing the ratchet wheel 54, together with its companion cam 46, one-eighth of a revolution. The turning of cam 46 from the position shown in Fig. 7 causes the contact arm 55 to be moved downward about the pivot 56, thus bringing contact 58 into connection with line 60 and breaking the circuit between line 59 and contact 57. A second operation of the tick selector push button 44 causes a further one-eighth revolution of cam 46 and returns arm 55 to the position shown in Fig. 7.

From the mechanism heretofore described it will be seen that the impulses produced by the audible ticks of the chronometer are first impressed on the 1 R. P. S. commutator which by reason of having half of its surface insulated eliminates one of these electrical impulses. The electrical circuit thus set up, which is for one-half second duration, is carried to the selector mechanism which utilizes this circuit should this impulse be the one desired. However, should the passage of the second hand across the scale indications occur during the duration of the alternate half second, the tick selector mechanism is brought into operation and the circuits established through the rotating commutator switched to produce the electrical impulse during the other half second period.

After selecting the proper audible signal from the speaker to coincide with the passage of the seconds hand across the scale indication the time comparator hand 11 is brought into coincidence with the second hand of the chronometer to be tested, by picking up the count of the chronometer seconds hand which is done by merely counting in unison with the seconds hand of the chronometer, counting each second by number as 25, 26, 27, 28 and continuing this count in unison with the audible ticks from the speaker, seconds indicating hand 11 is brought into close coincidence with the proper count. This would be close enough for an instrument to be timed to within one second or to within a half second but it is desirable to time a chronometer to within one one-hundredth of a second and it is necessary that accurate indication means be used to indicate exact coincidence between the indicator hand 11 and the seconds hand of the chronometer.

By means of the hand disc 2 the indicator hand 11 is brought into synchronism with the seconds hand of the chronometer and the difference in time between the chronometer and the 0 reading of the time comparator is read on the indicator scale 18.

The exact coincidence of the time comparator and the seconds hand of the chronometer is accomplished by means of a toothed wheel 29 and contacts 30, 31, and 32. Referring more specifically to Fig. 7 a different series of numbers is applied from those shown on Fig. 1, the motor 87 being the same motor as #1 in Fig. 1, said motor driving the toothed wheel 73 so that two consecutive teeth pass a given point every second. The toothed wheel 73 shown in Fig. 7 is drawn with eight teeth to clearly show the phase position of the contacts. Actually twenty teeth are used in the preferred form of this invention. Spring arms 74, 75, and 76 are so arranged about the toothed wheel 73 (#29 of Fig. 1) that within one half second, or the arc represented by one of the tooth projections, all three spring arms are contacted by the teeth of the wheel 73. As the wheel 73 is driven by the motor 87, which is the same motor driving the indicator hand 11, the relationship is such that the spring arm 75 will be placed to make electrical contact with the point 78 at the instant the indicator hand 11 is in exact coincidence with one-half second scale indications of the dial 12.

Glow lamps 80, 81 and 82 are operated from the output of the amplifying unit 41 and blink in unison with the one-half seconds ticks of the chronometer when contacts 76—79, 75—78 or 74—77 respectively are closed during the occurrence of said one-half seconds ticks. Exact coincidence of the indicator hand 11 with the audible ticks of the chronometer 40 is indicated by blinking of the glow tube 81 through the circuits 88, 78. The spring arms 74 and 76 are for convenience of the operator to operate glow tubes 82 and 80 respectively to indicate to said operator that the toothed wheel 73 is slightly retarded or advanced from its position for exact coincidence.

Referring to Fig. 2 the indicator hand 11 having been manually brought into exact coincidence with the hand of the chronometer 40, the amount by which the hand 11 has been advanced or retarded from standard time is indicated on the scale 22 and read at the index line 90, the scale being read to one one-hundredths of a second.

The extent or duration of the contact caused by the toothed wheel is such that duration of contacts 74—77 and 75—78 overlap making glow tubes 82 and 81 both lit over a short range of adjustment of the hand wheel 2. This is true when the seconds hand 11 is slightly advanced in relation to the seconds hand of the chronometer and a fine adjustment of the wheel 2 eliminates the blinking of the glow lamp 82 and indicates exact coincidence between the hand 11 and the seconds hand of the chronometer to be tested. This overlapping of duration of contact is equally true between contacts 76—79 and contacts 75—78 and shows a position at which the seconds indicating hand 11 is slightly retarded in relation to the seconds hand of the chronometer.

The operation of the device has been partially described along with the description of the parts, but to completely clarify, the microphone 41 is placed on the chronometer and the sounds carried to the amplifying unit and to the transformer. From the primary of the transformer the impulses created by the sounds are directed to the glow tubes 80, 81 and 82 and through the secondary of the transformer to the commutator 66 which eliminates one of the half seconds ticks.

The alternate half second ticks which remain are made audible through the speaker 43 and the operator synchronizes this tick with the passage of the seconds hand of the chronometer across the scale indications of the seconds reading scale of the chronometer dial. This selection is accomplished through the tick selector push button 44 and the ratchet relay which has been heretofore described.

The operator now being assured that the audible tick to which he is listening corresponds to the passage of the seconds hand of the chronometer across the scale indications he brings the seconds indicating hand 11 of the comparator into coincidence with the seconds hand of the chronometer, first by picking up the count through glancing at the chronometer seconds hand and then counting in unison with the audible ticks he brings the seconds indicating hand 11 of the comparator into apparent coincidence with the audible sounds emanating from the speaker, and the count. Exact synchronism between the seconds indicating hand 11 and the seconds hand of the chronometer is determined through the mechanical and electrical means heretofore described which operates the glow tubes 80, 81 and 82. Exact coincidence between the hand 11 and the seconds hand of the chronometer having been established, the amount by which the seconds indicating hand 11 has been advanced or retarded by revolving the dial wheel 2 is indicated on the scale 22, which scale is calibrated to give this time difference in hundredths of seconds.

Actually chronometers may be timed by this apparatus in from five to ten seconds which makes it possible not only to time a vast quantity by the use of a single piece of apparatus but also by maintaining a strict schedule allows the same chronometer to be timed at practically the same time every 24 hours.

To initially start the comparator (Fig. 7) the main switch 52, a double pole single throw switch is closed, connecting the city line A. C. with the amplifying unit 41 and with the electromagnet 53. It also connects through its other pole a standard A. C. line of exactly 60 cycles with a pivoted arm 61 and one side of a push button switch 62. Operation of the push button switch energizes the electromagnet 63 closing the arm 61 and the contact 64 which maintains operation of the electromagnet 63 to keep the comparator in operation. The electromagnet 63 is used to maintain the circuit because should any outside interruption in the flow of current in the standard frequency line occur, the connection between the arm 61 and the contact 64 would be broken and it would again be necessary to operate the push button 62 to start the apparatus. This relay mechanism prevents the apparatus from continuing to operate after momentary failure of the standard frequency current to warn the operator of said current failure.

Figure 3:
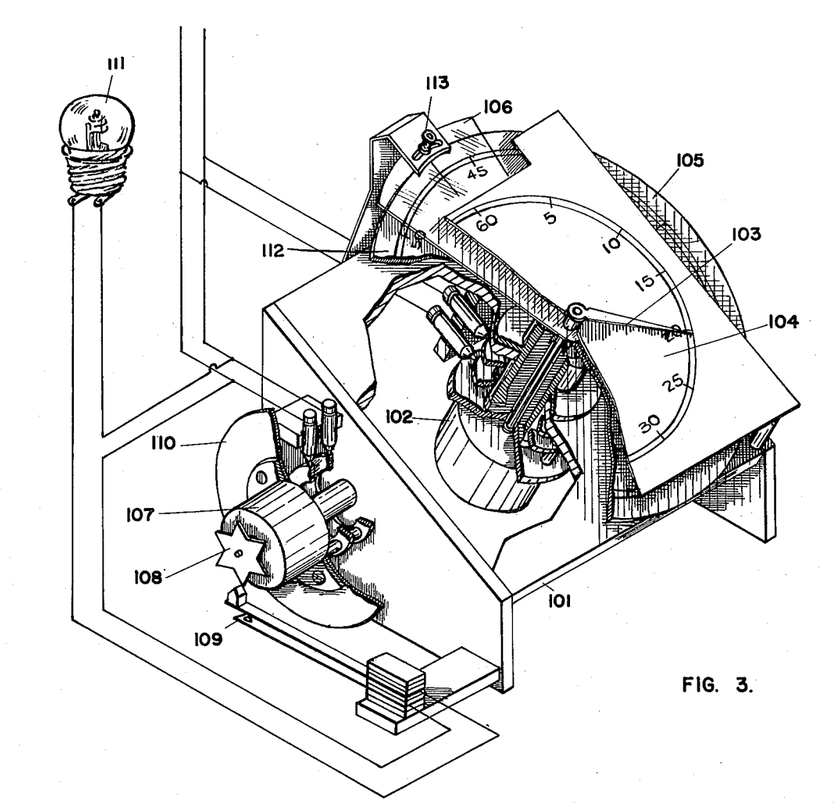
Fig. 3 is a broken perspective view of a comparator for timing chronometer watches to one-fifth of a second.

Referring to Fig. 3 a device similar to that which has been described is shown for accurately comparing timepieces to one-fifth of a second. A base 101 supports a synchronous motor 102 which operates from a source of standard frequency current turning the hand 103 which indicates seconds on the dial 104. Similar to the comparator heretofore described a hand wheel 105 revolves the motor 102 to advance or retard the hand 103 from the correct time. An index line carried by member 106 used in conjunction scale 112 indicates the amount of advancement or retardation necessary to bring the hand 103 into coincidence with the hand of a timepiece to be tested.

Figure 4:
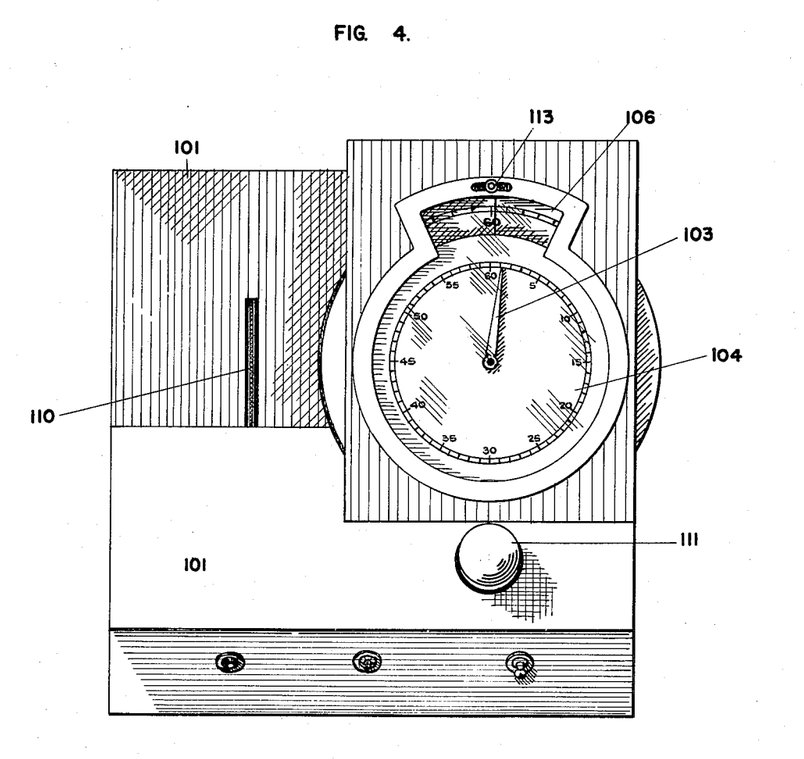
Fig. 4 is a front plan of the device as shown in Fig. 3.

As it is almost impossible for the human eye to synchronize separate hands on separate dials merely by watching first one hand and then the other, an arrangement is provided whereby the timepiece to be tested is first synchronized with a flashing light and this flashing light used in the final adjustment of the hand 103. This flashing light is used as a signal and it is to be understood that any signalling means may be used such as a speaker or other means. An apparatus for operating the flashing light consists of a synchronous motor 107 revolving ten times per minute and having a six prong star wheel 108 which closes a contact 109 once every second. By closely observing the passage of the hand of the timepiece across the second divisional lines of the seconds indicating scale of said timepiece, the flasher light may be brought into exact coincidence with this passage of the hand across the indicating marks by turning the hand wheel 110, thus either retarding or advancing the occurrence of the indicating flashes. The hand 103 is then brought into close coincidence with the hand of the timepiece to be tested by picking up the seconds count through awareness of the light flashes, the final accurate adjustment being made by observing the passage of the hand 103 across the indicating lines of its scale with the flashing of light 111, thus making perfectly sure that the timepiece to be tested is in exact synchronism with the hand 103 of the comparator, the difference between the timepiece to be tested and the correct time being read on the scale 112 of the hand wheel 105. It is, of course, understood that previous to the test a zero setting is made with the hand 103 being set exactly on standard time and the zero point of the scale 112 in coincidence with the index 106. For convenience in making this setting the index 106 is made adjustable through set screw 113 to compensate for small errors in starting the synchronous motor at the proper instant.

Figure 5:
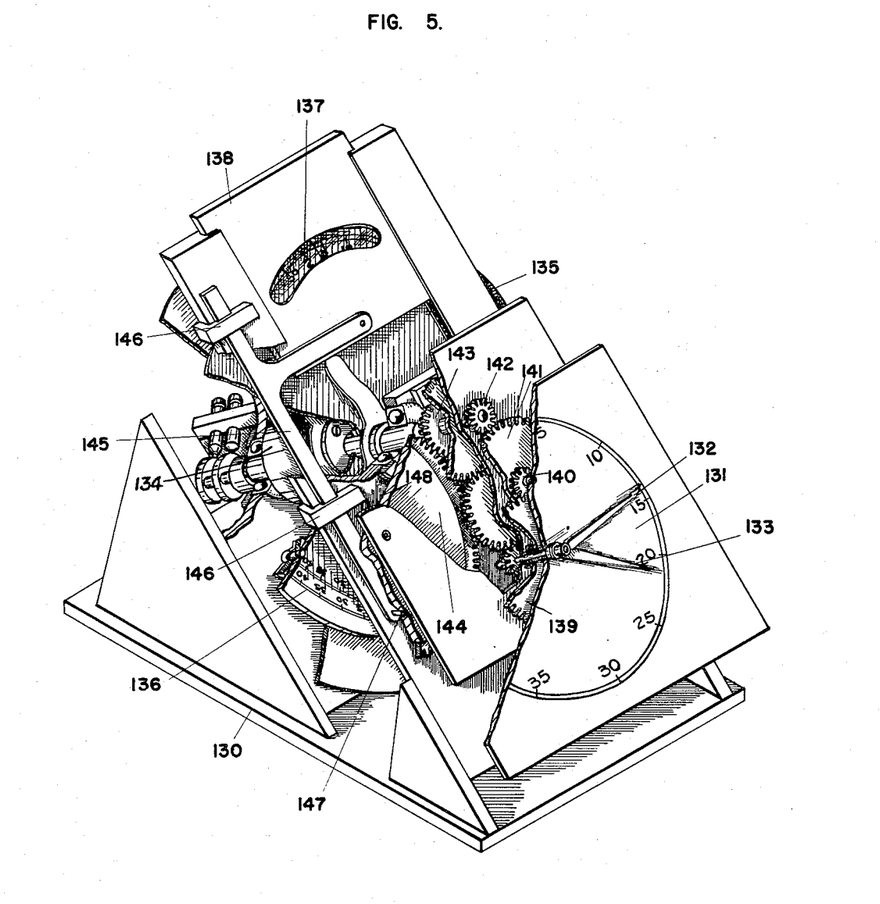
Fig. 5 is a broken perspective view of the apparatus used for comparing watches to one second.

Referring to Fig. 5 the comparator is mounted on a base 130 having a dial 131 with hands 132 and 133. This comparator is designed to check watches to within one second and has the usual synchronous motor 134 mounted on a hand wheel 135 and driving through suitable gearing the hands 132 and 133 of the indicating dial 131. The hand wheel 135 has a spiral scale reading 136 which is read through an opening 137 in a sliding panel 138, the opening being only wide enough to permit the reading of one line of figures at once.

Revolution of the indicating hand wheel 135 turns gear 143 and gear segment 144. Rotation of gear 143 is transmitted to pinion 142 through the connecting shaft and from pinion 142 to gear 141 to pinion 140, gear 139 and hand 133. The partial revolution of the gear segment 144 causes the operating arm 145 to slide in the guide 146 and move the panel 138 upward or downward. The sliding movement of this operating arm 145 is caused by the pin 147 engaging the groove 148 of the gear segment 144, the groove being spirally arranged in the gear segment to move the operating arm 145 vertically. This permits the scale indications 136 to be read for more than one revolution of the hand wheel 135.

Figure 6:
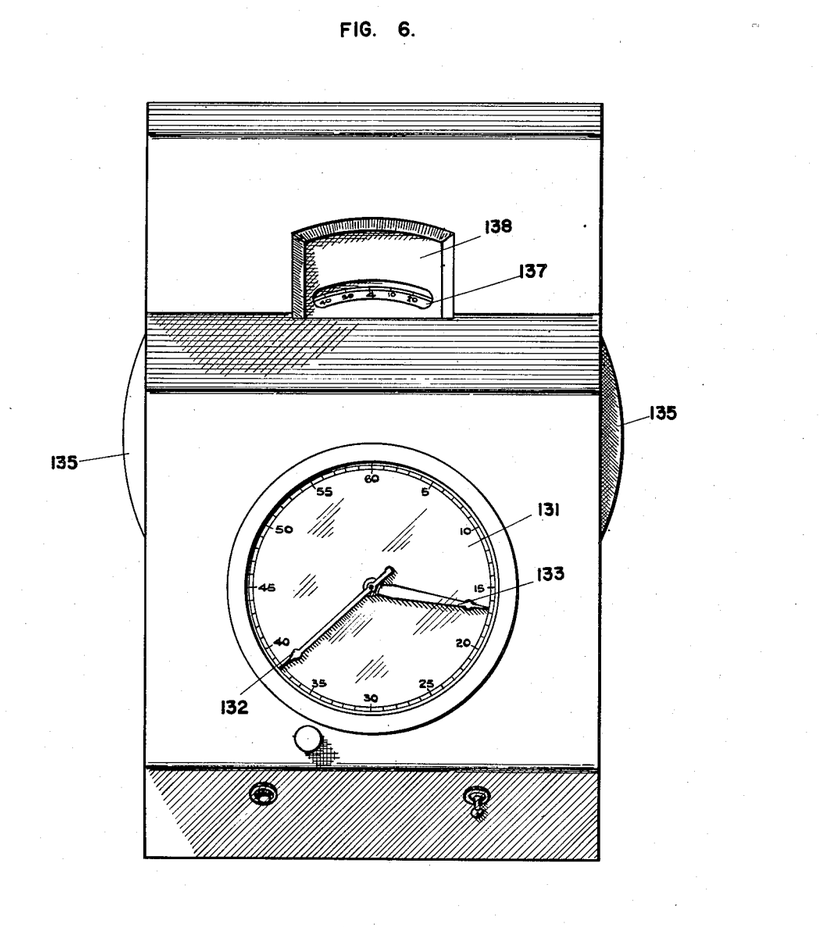
Fig. 6 is a front plan view of the device as shown in Fig. 5.

The operation of the comparator is similar to that of the ones previously described, the hands of the timepiece to be compared being synchronized with the minute hand 133 and seconds hand 132 by turning the hand wheel 135, the comparator having been first set to correct time with the scale 136 reading 0. This synchronizing of the indicator hand 132 by turning the hand wheel 135 will give a direct reading on the scale 136 of the difference in time of minutes and seconds between the timepiece to be compared and the correct time.

What I claim is:

1. A time comparator for comparing the audible ticks of a chronometer with standard time comprising a seconds hand synchronized with standard time, means for advancing or retarding said seconds hand from standard time, means indicating the amount of said advancement or retardation, a microphone for amplifying the ticks of said chronometer, an electrical circuit controlled by said microphone, a visible signal means synchronized with said seconds hand, a switch operated by said synchronized signal means, a circuit controlled by the ticks of said chronometer connected to said switch whereby the simultaneous closing of the switch by said synchronized means with a tick of said chronometer will operate said visible signal.

2. A time comparator for comparing the audible ticks of a chronometer, a source of standard frequency comprising a seconds hand synchronized with standard time, means for advancing or retarding said seconds hand from standard time, means indicating the amount of said advancement or retardation, a microphone for amplifying the ticks of said chronometer, an electric circuit controlled by said microphone, three visible signals in said electric circuit, a star wheel rotating with said seconds hand, three separate switches actuated by the rotation of said star wheel, said switches being in said electric circuit and adapted to control said visible signals respectively, whereby simultaneous closing of one of said switches with the tick of the chronometer indicates exact coincidence of said seconds hand with said chronometer tick and operation of either of the other signals indicates that said seconds hand is advanced or retarded from the point of coincidence.

3. A time comparator for comparing the audible ticks of a chronometer a source of standard frequency comprising a seconds hand synchronized with standard time, said seconds hand being operated by synchronous motor, means for revolving the motor either forward or backward to advance or retard the seconds hand from standard time, a dial turning with said motor to indicate the amount of such revolution and to indicate the seconds and portions of seconds advanced or retarded from standard time, a microphone amplifying the ticks of said chronometer, an electric circuit controlled by said microphone, a visible signal in said electric circuit, a switch for closing said circuit to operate said signal, means synchronous with said seconds hand for mechanically closing said switch, whereby simultaneous closing of the switch with the tick of the chronometer will operate said visible signal.

WILLIAM OGLE BENNETT, JR.

REFERENCES CITED

The following references are of record in the file of this patent:

UNITED STATES PATENTS

| Number | Name | Date |
|---|---|---|
| 2,066,349 | Hellweg et al. | Jan. 5, 1937 |
| 2,092,039 | Young | Sept. 7, 1937 |
| 2,120,140 | Agnew | June 7, 1938 |
| 2,188,059 | Norrman | Jan. 23, 1940 |
| 2,317,202 | Kohlhagen | Apr. 20, 1943 |
| 2,322,861 | Luckey | June 29, 1943 |
| 2,352,906 | Lyons | July 4, 1944 |